United States Patent [19]

Burrows et al.

[11] Patent Number: 4,607,176

[45] Date of Patent: Aug. 19, 1986

[54] TALLY CELL CIRCUIT

[75] Inventors: James L. Burrows, Merrimack, N.H.; Stephen B. Butler, Cumberland, R.I.

[73] Assignee: The United States of America as represented by the Secretary of the Air Force, Washington, D.C.

[21] Appl. No.: 643,203

[22] Filed: Aug. 22, 1984

[51] Int. Cl.$^4$ .................... H03K 19/096; H03K 19/20
[52] U.S. Cl. .................... 307/449; 307/452; 307/585; 307/465
[58] Field of Search ............... 307/451, 452, 579, 585, 307/449, 465; 357/23.7

[56] References Cited

U.S. PATENT DOCUMENTS

| | | | |
|---|---|---|---|
| 3,634,658 | 1/1972 | Brown | 377/33 |
| 3,676,702 | 7/1972 | McGrogan | 307/585 |
| 3,828,547 | 8/1974 | Fujita | 307/451 |
| 3,943,378 | 3/1976 | Beutler | 377/117 |
| 4,114,049 | 9/1978 | Suzuki | 377/105 |
| 4,336,445 | 6/1982 | Baker et al. | 377/37 |
| 4,371,795 | 2/1983 | Mulder et al. | 307/440 |
| 4,511,814 | 4/1985 | Matsuo et al. | 307/579 |

OTHER PUBLICATIONS

MOS FET's & Integrated Circuits by Richman Pub. by J. Wiley & Sons (1973), pp. 229-232, "Complementary Silicon-On-Saphire MOS FET's" Chap., 7,8.2.

Mead, C. and Conway, L. "Introduction to VLSI Systems" Addison-Wesley Publishing Co. 1980, pp. 78-79, Plate 7(b).

Swartzlander, E. E. Jr., "Parallel Counters" *Computer Arithmetic*, E. E. Swartzlander Ed., Dowden, Hutchinson & Ross Inc., Stroudsburg, PA.

Primary Examiner—John S. Heyman
Attorney, Agent, or Firm—Donald J. Singer; William Stepanishen

[57] ABSTRACT

A tally cell circuit for counting the number of logical ones in an input signal utilizing a parallel-series combination of four CMOS field-effect transistors. The number of input ones in the input are expressed in a binary code at the output of the tally cell circuit.

1 Claim, 5 Drawing Figures

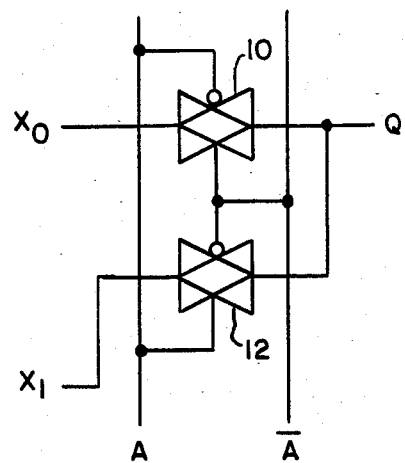
FIG. IA
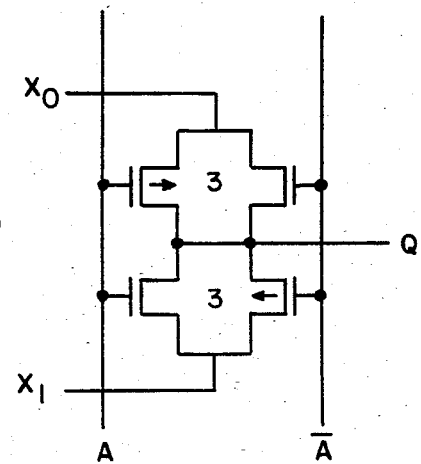
FIG. IB
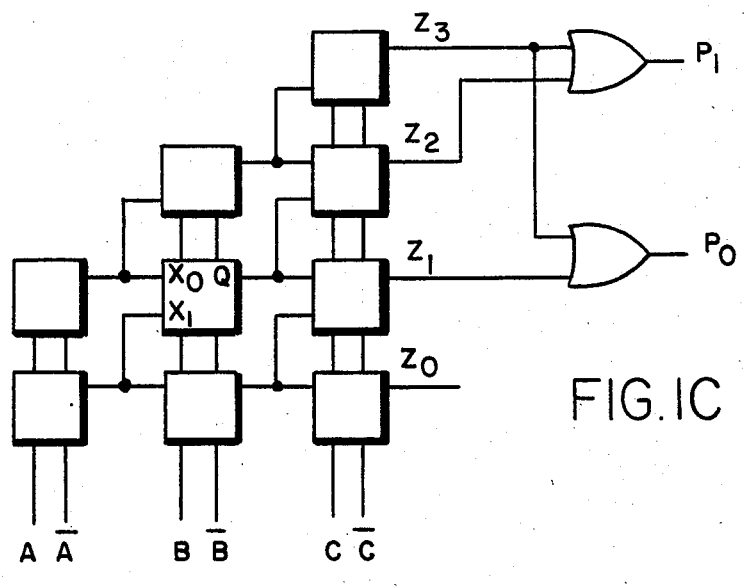
FIG. IC

TALLY CELL CIRCUIT

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a counting circuit, and in particular to a tallying circuit for counting the number of logical ones in an input.

Counting circuits may comprise any of several types of functional circuits which are used in the switching or digital data-processing systems, such as dial telephone systems and digital computers. The general function of a counting circuit is to receive and count repeated current or voltage pulses, which represent information arriving from some other circuit within the same system or from a source external to the system. Counting circuits may be devised with a variety of switching circuit devices, such as electromagnetic relays, vacuum tubes, and transistors.

The basic requirement of a counting circuit is to detect each incoming pulse and to establish within itself a unique state for each successive appearance of such a pulse. The number of pulses that have arrived can then be indicated to another circuit by an output which reflects the particular state of the counting circuit.

Obviously, the simplest counter is one that counts only a single pulse. With electromagnetic relays the counting of a single pulse requires at least two relay actions, one to record the arrival of the input signal, and a second to record its disappearance. A simple binary counter may utilize a pair of transistors in a flip-flop circuit arrangement. In this type of circuit, the rest or the normal (no count) state is designated by one transistor conducting, while the other transistor is cut off. The first positive input pulse will be applied to the base of the conducting transistor (first) which causes it to cut off and the other transistor (second) to conduct. The second positive input pulse will now pass to the base of the second transistor (conducting) causing it to cut off and causing the first transistor (cut off) to conduct. After two input pulses, therefore, the circuit is back to its normal state.

SUMMARY OF THE INVENTION

The present invention utilizes a tally cell circuit to perform the function of tallying or counting the logical ones which are present at a plurality of parallel inputs and to produce a binary number at its output which expresses this value. The tally cell circuit is useful in fast multipliers for performing the final summation of partial products and in bit-slice processors for tallying the number of logical ones which are present in each slice. The tally cells are in the form of complementary-symmetry metal oxide semiconductors (CMOS) which are formed on a silicon-on-sapphire (SOS) substrate. The complete circuit uses only tally cells and NOR gates.

It is one object of the present invention, therefore to provide an improved tally cell circuit.

It is another object of the invention to provide an improved tally cell circuit which provides an output code for the number of logical ones in an input signal.

It is another object of the invention to provide an improved tally cell circuit having a variable array of tally cells.

It is another object of the invention to provide an improved tally cell circuit wherein the size of a multiplier unit is substantially reduced.

These and other advantages, objects and features of the invention will become more apparent after considering the following description taken in conjunction with the illustrative embodiment in the accompanying drawings.

BRIEF DESCRIPTION OF THE DRAWINGS

FIG. 1a is a logic symbol diagram of a tally cell;

FIG. 1b is a schematic diagram of a tally cell;

FIG. 1c is a logical block diagram of a tally cell circuit;

DESCRIPTION OF THE PREFERRED EMBODIMENT

Figure 2:
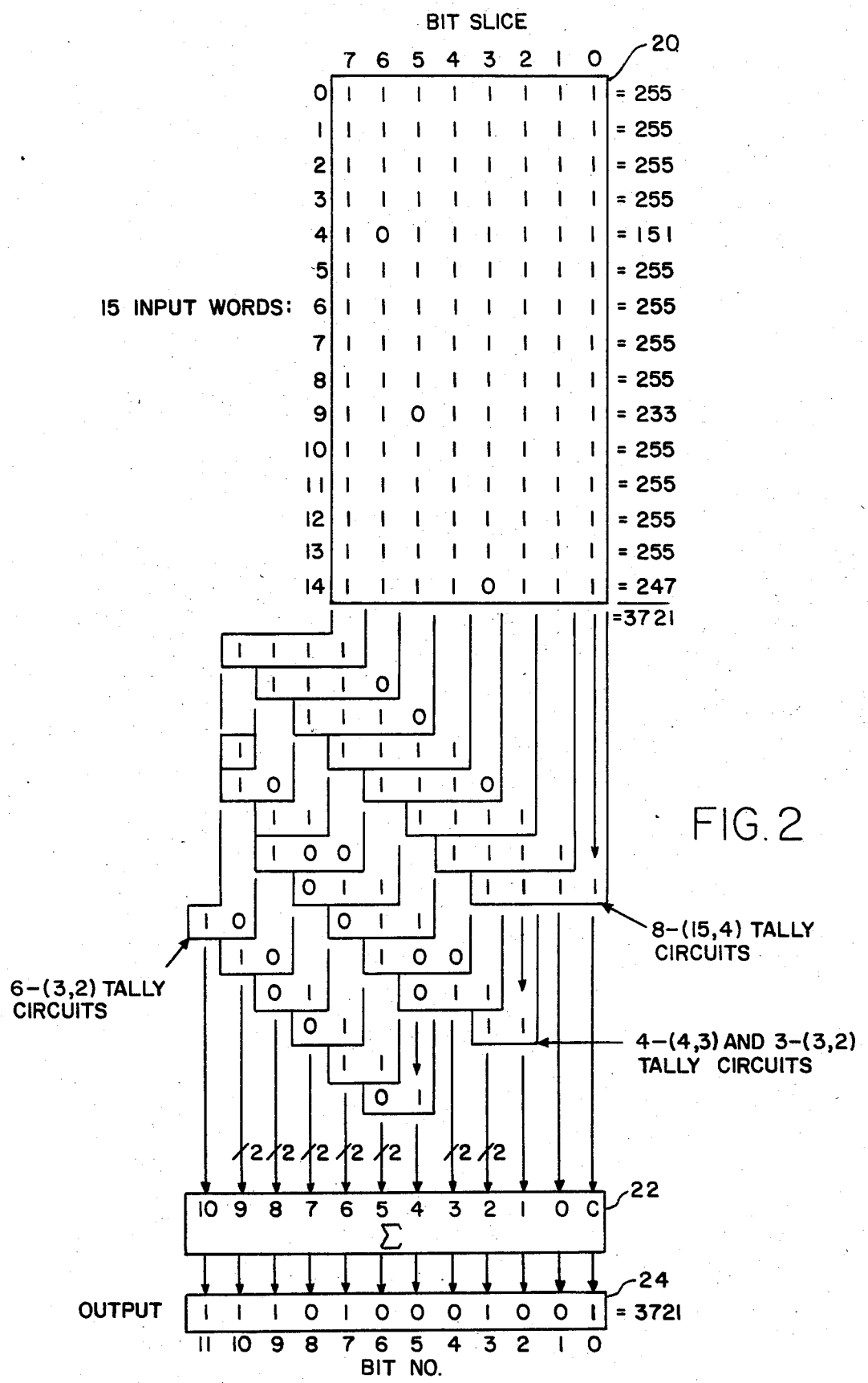
FIG. 2 is a logical block diagram of a cascade tally cell circuit for a 15 word by 8 bit bit slicer adder.

Tally circuits which are generally referred to as counters in the prior art, perform the highly useful function of tallying or counting the number of logical ones that are present at an input and outputting a binary number expressing this value. The tally circuits are vital components in fast multipliers which perform the final summation of partial products, and in bit-slice processors for tallying the number of logical ones that are present in each slice. The term, counting, is misleading since it implies a serial operation. Tallying, as described here, is a highly parallel cascade operation. In shorthand, tally circuits are described by the notation (m, n), where m is the maximum number of input bits and n is the number of bits required to express m in binary form. Thus, a (7,3) tally circuit can tally up to 7 input logical ones and express the total in three bits. Therefore, utilizing this notation, typical tally circuits may be designated as (3,2), (4,3), (7,3), (15,4), (31,5), etc.

For use as memory processing elements, the (3,2) tally circuit is generally the most useful because it handles the three output bits from ROM X-Y multipliers, etc. The (3,2) tally circuit is none other than the familiar carry-save adder. The three inputs are A, B and C (carry-in) and the two outputs are S (save) and C (carry-out). Carry-save adders (SCAs) are very simple structures and can easily handle the outputs of three-ROM memory processors.

For larger values of m, however, the tally circuits are organized in cascades with high order circuits, (15,4)'s, driving (7,3)'s driving (3,2)'s which drive the final two-input adder. The intent of this whole operation is propagate up the number of inputs whose weights are 1, 2, 4, 8, 16, 32, etc., so that the number of ones, twos, threes, eights, etc. which are input to the final adder are either 0, 1, or 2. Tally circuits, however, are, not memory processors and therefore could not be expected to function efficiently in ROM units. The tally circuits will be most efficiently utilized in highly regular arrays which service the outputs of ROM units which do the multiply or multiply-and-sum operations.

Referring now to FIG. 1a there is shown a logic symbol diagram of a tally cell comprising first and second switching elements 10, 12. The first and second switching elements 10,12 respectively receive an input signal, $X_0$, $X_1$ and have a common output, Q. The two rail selector bus A, $\overline{A}$ is connected as shown and operates in a see-saw fashion. In other words, when one switching element is switched on, the other switching element is switched off. The operation of the switching elements 10, 12 is mutually exclusive. The simple tally cell which is shown in FIG. 1a may be constructed in 1.25 micron CMOS/SOS substrate using transistors with a width/length (W/L) ratio of 3. An array of such cells would require about 0.9 mils$^2$ of chip area per cell.

In FIG. 1b there is shown a schematic diagram of the simple tally cell utilizing two pairs of field effect transistors. In FIG. 1c there is shown a block diagram of a (3,2) tally cell circuit which uses six tally cells and two NOR gates. This small tally cell circuit might require approximately 10 mils$^2$ of chip area. The truth table for the (3,2) tally cell circuit is as follows:

| (3,2) TALLY CIRCUIT TRUTH TABLE | | | | | | | | |
|---|---|---|---|---|---|---|---|---|
| A | B | C | $Z_0$ | $Z_1$ | $Z_2$ | $Z_3$ | $P_1$ | $P_0$ |
| 0 | 0 | 0 | 1 | 0 | 0 | 0 | 0 | 0 |
| 0 | 0 | 1 | 0 | 1 | 0 | 0 | 0 | 1 |
| 0 | 1 | 0 | 0 | 1 | 0 | 0 | 0 | 1 |
| 0 | 1 | 1 | 0 | 0 | 1 | 0 | 1 | 0 |
| 1 | 0 | 0 | 0 | 1 | 0 | 0 | 0 | 1 |
| 1 | 0 | 1 | 0 | 0 | 1 | 0 | 1 | 0 |
| 1 | 1 | 0 | 0 | 0 | 1 | 0 | 1 | 0 |
| 1 | 1 | 1 | 0 | 0 | 0 | 1 | 1 | 1 |

Turning now to FIG. 2 there is shown a logical block diagram of a cascade tally cell circuit for a fifteen word by eight bit bit-slicer adder unit. The bit/slicer unit 20 has a fifteen word input for the bit-slice addition of up to fifteen eight-bit numbers. The first stage of the cascade is comprised of eight - (15,4) tally cell circuits. The numbers in each tally cell circuit are four-bit binary representations of the number of logical ones in the fifteen-bit column with which it is associated, as indicated by the arrow. Outputs which require no further tallying (i.e., bits with weight of 2° and 2') can be fed directly to the two-input adder/summer unit 22. The other outputs are fed to the second stage of the cascade tally circuit which comprises four - (4,3) and three - (3,2) tally cell circuits. The numbers in each of these tally cell circuits are the two or three bit binary representations of the number of logical ones in the three or four bit columns of first stage tally circuit outputs with which it is associated as indicated by the arrow. Again, outputs which require no further tallying can be fed directly to the adder/summer unit 22. The others are fed to the third stage of the cascade which consists of six (3,2) tally cell circuits. Their outputs, the 1 or 2 bits in the column, are fed to the adder as input pairs, $a_n b_n$, and in the case where there is only one input, a, is available, b is a wired zero. The final tally in the adder/summer unit 22 is applied to the output register unit 24.

While this might appear to be a complex arrangement, it is really quite simple since tally all circuits are highly regular arrays of very simple cells which comprise four transistors and require only 0.9 mil$^2$ in 1.25 micron CMOS/SOS substrate.

Figure 3:
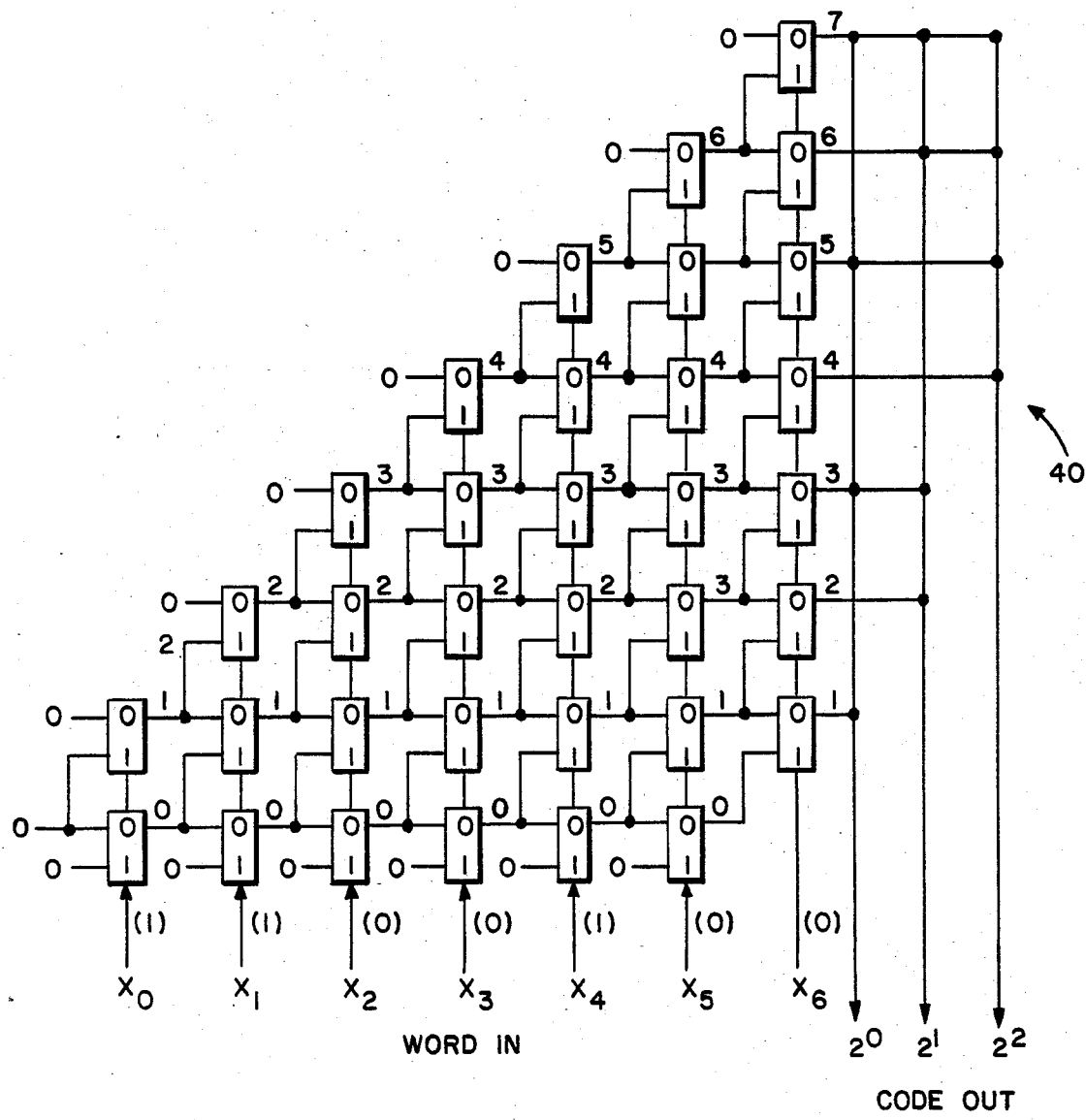
FIG. 3 is a circuit diagram for a (7,3) tally cell circuit.

In FIG. 3, there is shown a circuit diagram for a (7,3) tally cell circuit wherein the word in is a seven-bit input, $X_0$-$X_6$ and the code out is a three-bit output in binary form. The final output lines from the cascade tally cell circuit is fixed wired in an or configuration, 40.

The present example is another illustration of the use of the basic tally cell as a building block for a tally circuit in which a wired or configuration is utilized rather than a logic or circuit.

Although the invention has been described with reference to a particular embodiment, it will be understood to those skilled in the art that the invention is capable of a variety of alternative embodiments within the spirit and scope of the appended claims.

What is claimed is:

1. A tally circuit comprising in combination:
   a first and second switching means having respectively a first and second state, said first and second switching means each having an input, a control terminal and an output, said output of each of said first and second switching means being connected to form a single output, said first and second switching means respectively connected to a two rail selector bus, said first and second switching means connected to each other in a mutually exclusive manner wherein when said first switching means is in the on state said second switching means is in the off state, said two rail selector bus connected to said control terminal to provide control signals to said first and second switching means to maintain the mutually exclusive operation thereof, said first and second switching means receiving a logical signal comprising logical ones and zero at their respective inputs and providing a ones signal output in response to the number of logical ones in the input logical signal, said first and second switching means forming a tally cell, a plurality of said tally cells being arranged in a descending order parallel-series tally cell circuit for counting the number of logical ones in an input signal, said tally cells respectively having a pair of inputs, said plurality of parallel inputs, said descending order occurring from the input of said tally cell circuit to the output thereof, the number of input ones in said plurality of parallel inputs are expressed as a binary code at the output of said tally cell circuit, said first and second switching means respectively comprising in combination:
   a first and second field effect transistor having their respective sources and drains connected in parallel with each other,
   a third and fourth field effect transistor having their respective sources and drains connected in parallel with each other, said drains of said first, second, third and fourth field effect transistors are respectively connected to each other to form the signal output, said first and third field effect transistors having their respective gates connected to one rail of said two rail selector bus, said second and fourth field effect transistors having their respective gates connected to the other rail of said two rail selector bus, said logical signal being applied respectively to the common source of said first and second field transistors and, said third and fourth field effect transistor, said first, second, third and fourth field effect transistors each comprise a CMOS transistor which is formed on a silicon-on-sapphire substrate.

* * * * *